(12) United States Patent
Yeh (10) Patent No.: US 6,543,734 B2
(45) Date of Patent: Apr. 8, 2003

(54) FLAT PANEL DISPLAY APPARATUS AND MOUNTING APPARATUS THEREIN

(75) Inventor: Chih-Feng Yeh, Taipei (TW)

(73) Assignee: Acer Inc. (TW)

( * ) Notice: Subject to any disclaimer, the term of this patent is extended or adjusted under 35 U.S.C. 154(b) by 0 days.

(21) Appl. No.: 09/860,507

(22) Filed: May 21, 2001

(65) Prior Publication Data

US 2001/0032857 A1 Oct. 25, 2001

(30) Foreign Application Priority Data

Dec. 1, 2000 (TW) .................................. 89220946 U (51) Int. Cl.[7] .................................................. F04G 3/00
(52) U.S. Cl. ..................................... 248/291.1; 248/917
(58) Field of Search ............................. 248/291.1, 917, 248/922, 923, 919, 920, 455, 457, 188.8, 188.9

(56) References Cited

U.S. PATENT DOCUMENTS

| | | | | |
|---|---|---|---|---|
| 4,729,533 A | * | 3/1988 | Hillary et al. | 248/184 |
| D295,415 S | * | 4/1988 | Thies et al. | D14/114 |
| 4,834,329 A | * | 5/1989 | Delapp | 248/183 |
| D326,847 S | * | 6/1992 | Savio | D14/113 |
| D337,104 S | * | 7/1993 | Orchard | D14/113 |
| 5,235,495 A | * | 8/1993 | Blair et al. | 361/680 |
| D344,933 S | * | 3/1994 | Wiseman et al. | D14/94 |
| D349,489 S | * | 8/1994 | Wang | D14/113 |
| 5,812,368 A | * | 9/1998 | Chen et al. | 361/681 |
| 5,842,672 A | * | 12/1998 | Sweere et al. | 248/278.1 |
| 6,288,891 B1 | * | 9/2001 | Hasegawa et al. | 361/681 |

* cited by examiner

Primary Examiner—Ramon O. Ramirez
Assistant Examiner—Kofi Schulterbrandt
(74) Attorney, Agent, or Firm—Michael D. Bednarek; Shaw Pittman LLP (57) ABSTRACT

A flat panel display apparatus with a mounting apparatus includes a display screen, a handle member, a supporting member and a stand member. The handle member is disposed at the edge or the rear of the display screen. The supporting member is pivotally secured to the handle member. The supporting member has a first arm portion and a second arm portion where an obtuse angle is formed between the first arm portion and the second arm portion. The stand member is disposed at an end of the second arm portion to provide friction between the second arm portion and contacted surface thereon and prevent the second arm portion from escaping as the display screen is in an upright position.

16 Claims, 8 Drawing Sheets

FLAT PANEL DISPLAY APPARATUS AND MOUNTING APPARATUS THEREIN

REFERENCE TO RELATED APPLICATIONS

This application claims the benefit of priority under 35 U.S.C. §119(a) of Taiwan Patent Application No. 089220946, filed Dec. 1, 2000.

BACKGROUND OF THE INVENTION

1. Field of the Invention

The present invention relates to a flat panel display apparatus, and more particularly to a flat panel display screen with a mounting apparatus. According to the present invention, a tube member of the supporting member is pivotally secured to a handle member. As a result, the flat panel display apparatus can be installed on a ceiling or a wall via adjusting the pivot action of the supporting member. A stand member is disposed at an end of the supporting member allowing the flat panel display apparatus to stand on a level.

2. Description of the Related Art

Various arrangements for the flat panel display apparatus are mainly focused on the base variations in the prior art. Conventional base structure base for a flat panel display apparatus has a complicated mechanism.

SUMMARY OF THE INVENTION

In view of the complication of the base structure in the prior art and the limitation of which base for a conventional flat panel display merely serves to stand on a level, the objective of the present invention is to provide flat panel display apparatus with mounting apparatus to overcome the problem. Said flat panel display apparatus comprises a display screen, a connecting member, supporting member and a stand member.

The connecting member is disposed at the edge or the back of the display screen. A supporting member is pivotally secured to the connecting member. The supporting member comprises a first arm portion and a second arm portion where an obtuse angle is formed between the first arm portion and the second arm portion. The stand member is made of rubber and disposed at an end of the second arm portion to provide friction between the second arm portion and contacting surface thereon and prevent the second arm portion from escaping as the display screen is in an upright position.

The supporting member further comprises a tube member pivotally secured to an end of the first arm portion to allow the supporting member to pivot on the connecting member.

A predetermined height of the supporting member ranges from the 0.8-fold to one-fold of the total length of an upright flat panel display and the connecting member attached therewith.

The second arm portion further comprises a plurality of screw holes for fastening the mounting apparatus to either a wall or a ceiling.

BRIEF DESCRIPTION OF DRAWINGS

The following detailed description, given by way of an example and not intended to limit the invention to the embodiments described herein, will best be understood in injunction with the accompanying drawings, in which.

DETAILED DESCRIPTION OF THE INVENTION

Two preferred embodiments of the present invention-flat panel display apparatus mounting apparatus are described below.

First Embodiment

Figure 1:
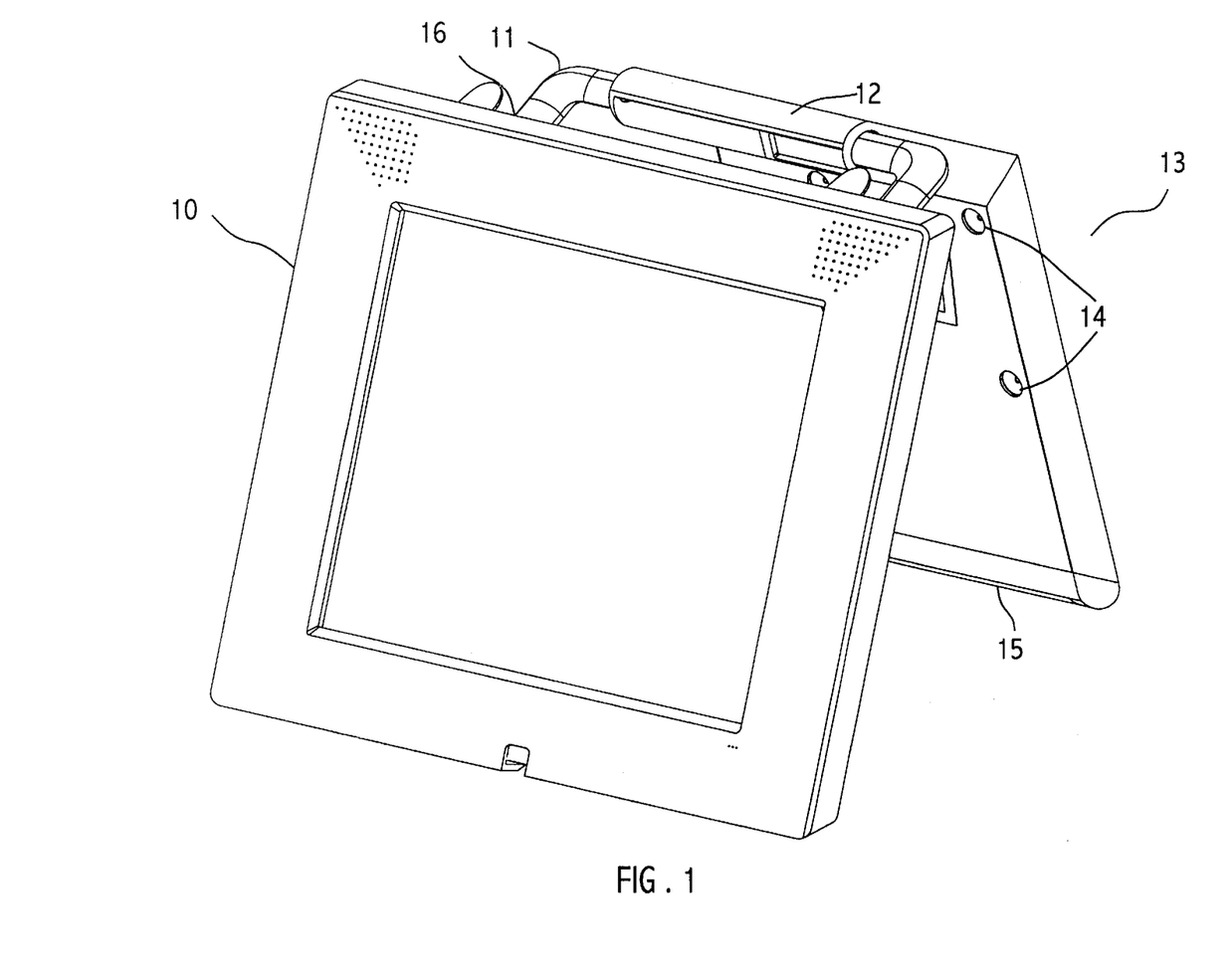
FIG. 1 illustrates a perspective view according to a first preferred embodiment of the invention.

FIG. 1 illustrates a perspective view according to a first preferred embodiment of the invention. The flat panel display apparatus comprises a display screen 10, a handle member 11, a supporting member 13 and a stand member 15. There are various current flat panel display apparatuses such as liquid crystal display (LPP) panel, plasma display (PD) panel and field emission display. The handle member 11 is disposed at the edge 16 of the display screen 10. The handle member 11 has a U shape with two ends secured to the edge 16 of the display screen 10.

Figure 2:
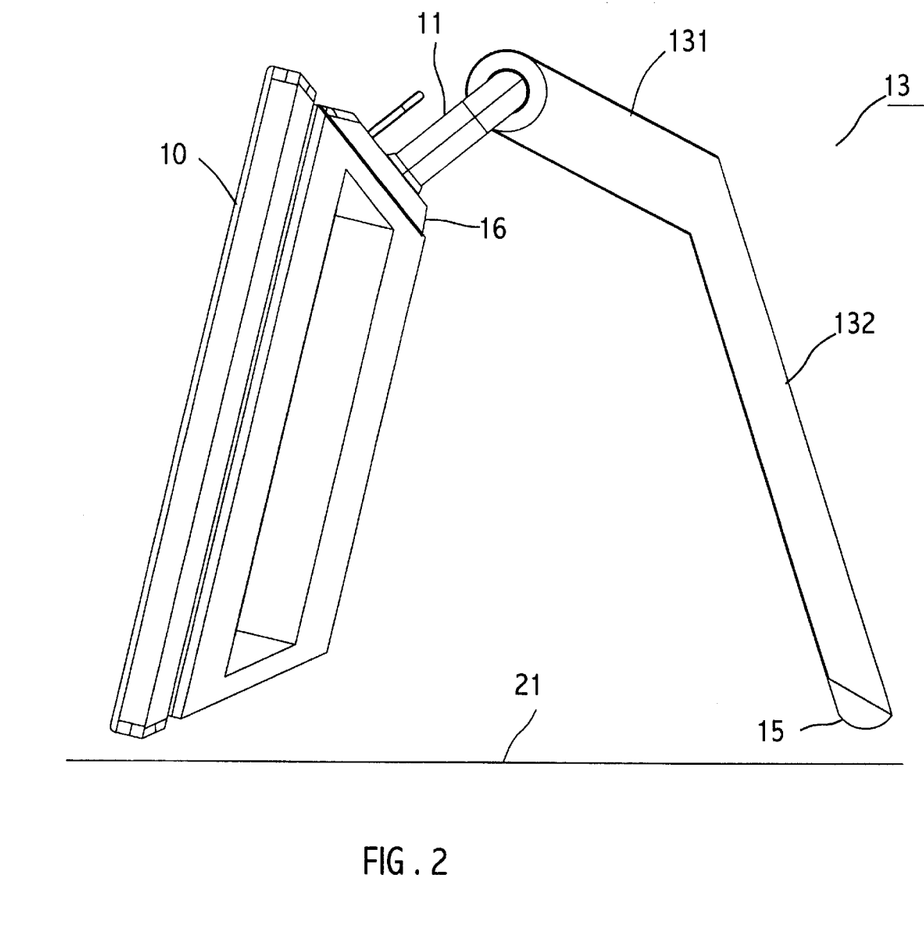
FIG. 2 illustrates a side elevational view showing the operation of the first preferred embodiment of the invention.

Referring to FIG. 2, the supporting member 13 has a first arm portion 131 and second arm portion 132. The first arm portion 131 and second arm portion 132 forms an obtuse angle. The first arm portion 131 is pivotally secured to the handle member 11. Securing means can be disposing a tube member 12 at an end of the first arm portion 131; thereby users can adjust the angle between the display screen 10 and supporting member 13. The stand member 15 covers the end of the second arm portion 132 of the supporting member 13. The second arm portion 132 has at least one hole 14.

According to the embodiment shown in the FIG. 1, users pivot the supporting member 13 to an appropriate angle to allow the display screen 10 to stand on the desk 21. The stand member 15 is used as a material to provide friction for the supporting member 13 against the desk 21, such that the supporting member 13 does not escape due to a large angle between the first arm portion 131 and second arm portion 132.

The stand member 15 is made of rubber. A predetermined height of the supporting member ranges from the 0.8-fold to one-fold of the total length of an upright flat panel display and the handle member attached therewith. The range is determined for maintaining the balance,of the display screen 10 as it stands on the desk 21 with the supporting member 13.

Figure 3:
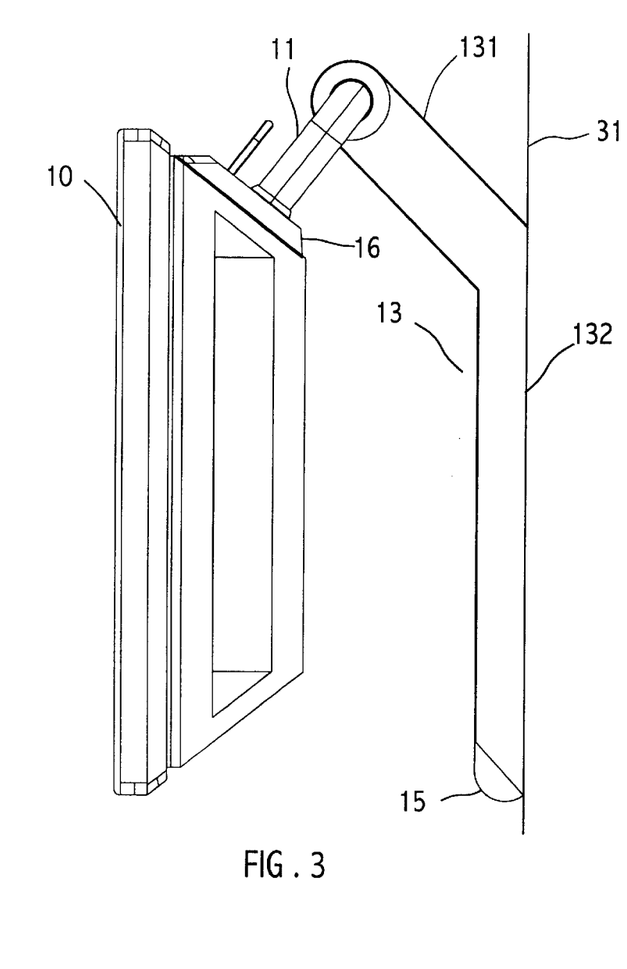
FIG. 3 illustrates a side elevational view showing an alternative operation of the first preferred embodiment of the invention.

FIG. 3 is an alternative application of mounting a flat panel display apparatus. In which, users pivot the supporting member 13 to an appropriate angle and followed that mount the supporting member 13 to the wall 31 with holes 14 on the supporting member 13 to support the display screen 10.

Figure 4:
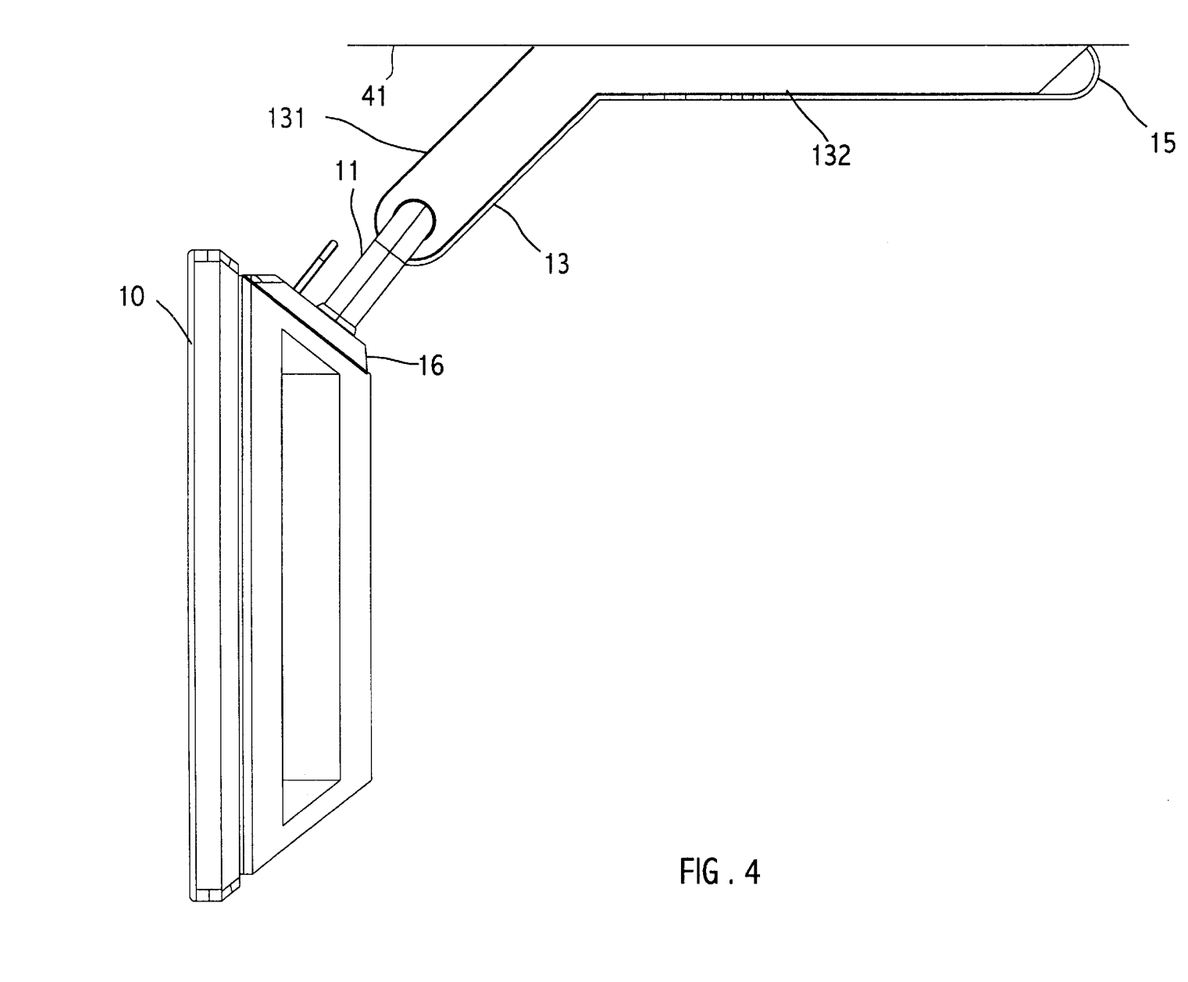
FIG. 4 a side elevational view showing another alternative operation of the first preferred embodiment of the invention.

FIG. 4 illustrates the other application of mounting a flat panel display apparatus, where users pivot the supporting member 13 to an appropriate angle and followed that mount the supporting member 13 to the ceiling 41 to support the display screen 10.

Alternative Preferred Embodiment

Figure 5:
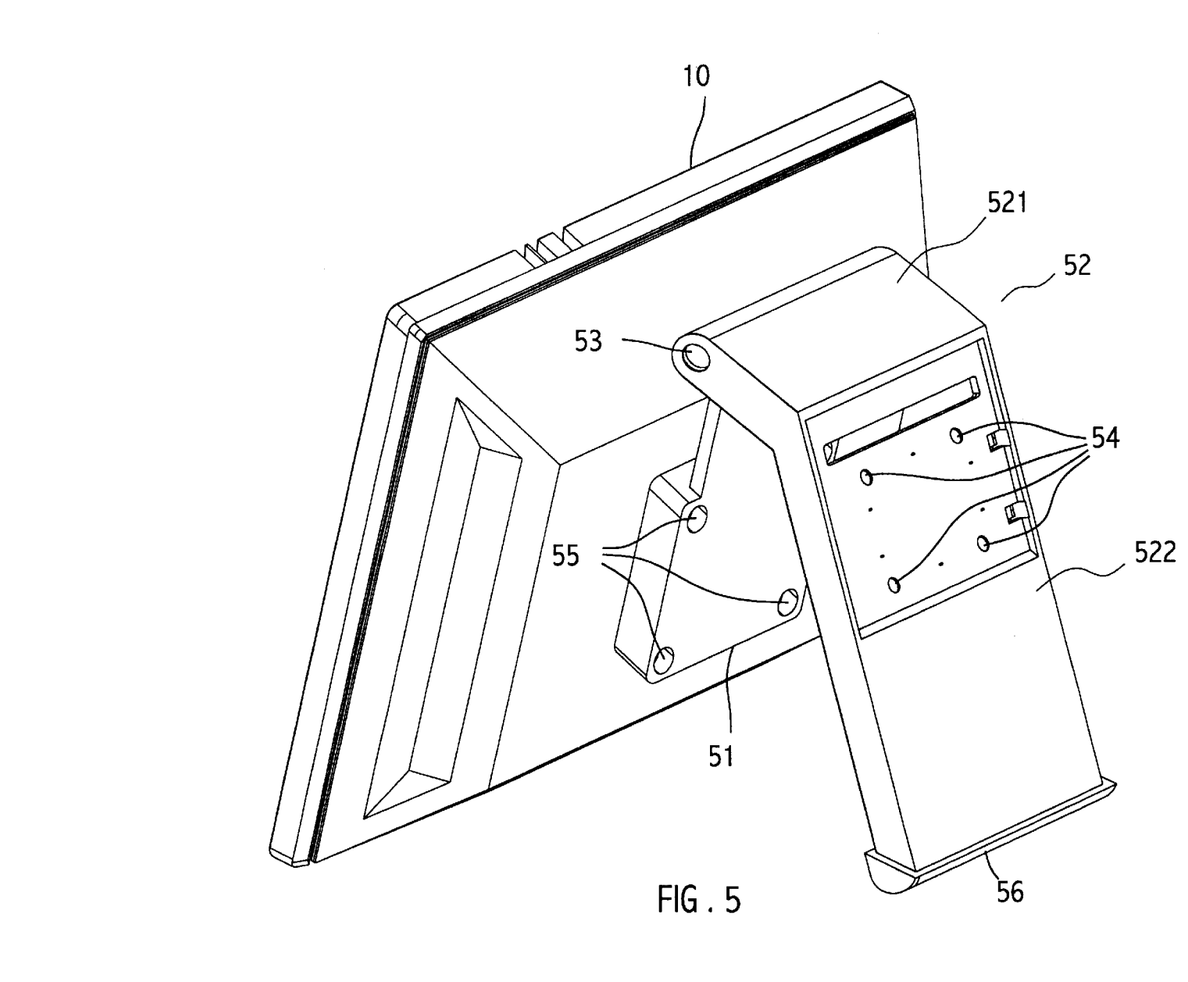
FIG. 5 illustrates a perspective view according to a second preferred embodiment of the invention.

An alternative preferred embodiment of the present invention is described below in connection with FIGS. 5–8. FIG. 5 comprises a display screen 10, a connecting member 51, a supporting member 52 and a stand member 15. The connecting member 51 is mounted through the holes 55 to the back of the display screen 10.

The supporting member 52 is pivotally secured to the connecting member 51. The supporting member 52 has a first arm portion 521 and a second arm portion 522. The first arm portion 521 and second arm portion 522 forms an obtuse angle. The second arm portion 522 comprises a plurality of holes 54.

A predetermined height of the supporting member 52 ranges from the 0.8-fold to one-fold of the total length of an upright display screen 10 and the connecting member 51 attached therewith. The range is determined to allow the display screen 10 to maintain balance as it stands on the desk 21 with the supporting member 52.

The stand member 15 is used to prevent the supporting member 52 from escaping as the display screen 10 is in an upright position. In the alternative preferred embodiment, the stand member 15 is made of rubber.

Figure 6:
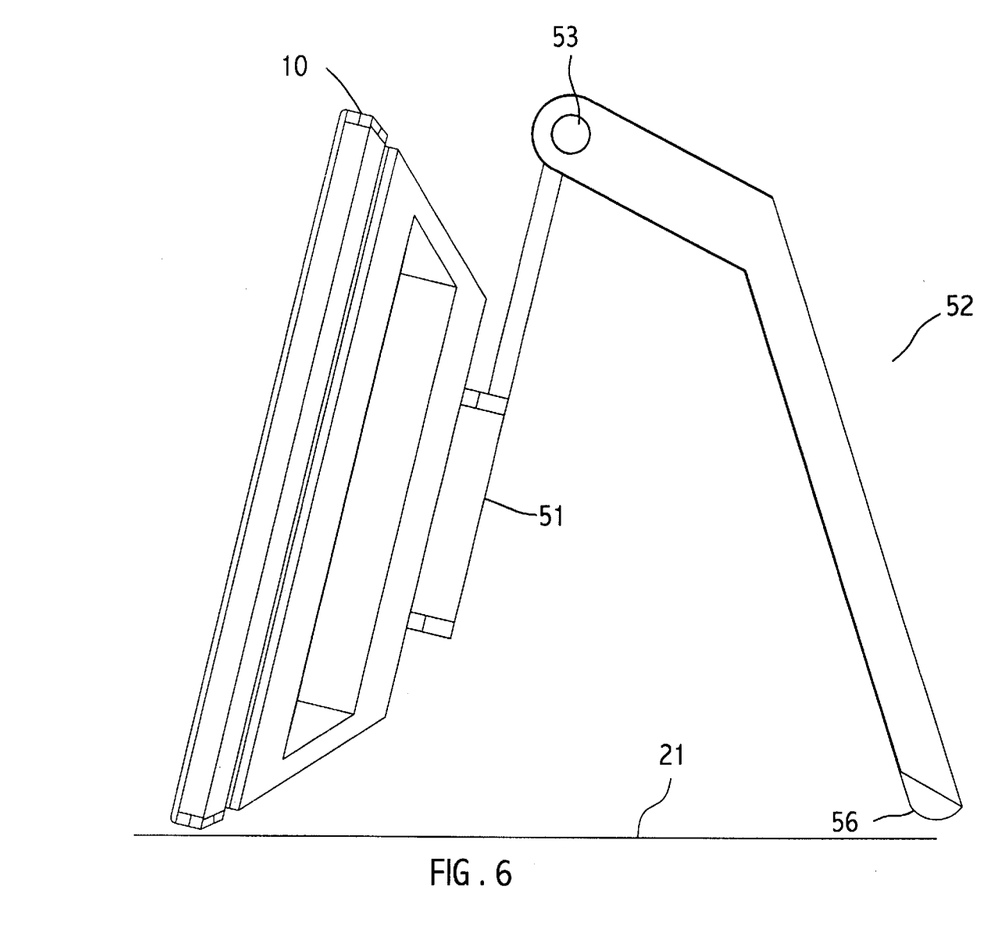
FIG. 6 illustrates a side elevational view showing the operation of the second preferred embodiment of the invention.

Referring to FIG. 6, users pivot the supporting member 52 to an appropriate angle to allow the display screen 10 to stand on the desk 21. The stand member 56 is used as a material to provide required friction for the supporting member 52 against the desk 21, such that the supporting member 52 does not escape due to a large angle between the supporting member 52 and display screen 10.

Figure 7:
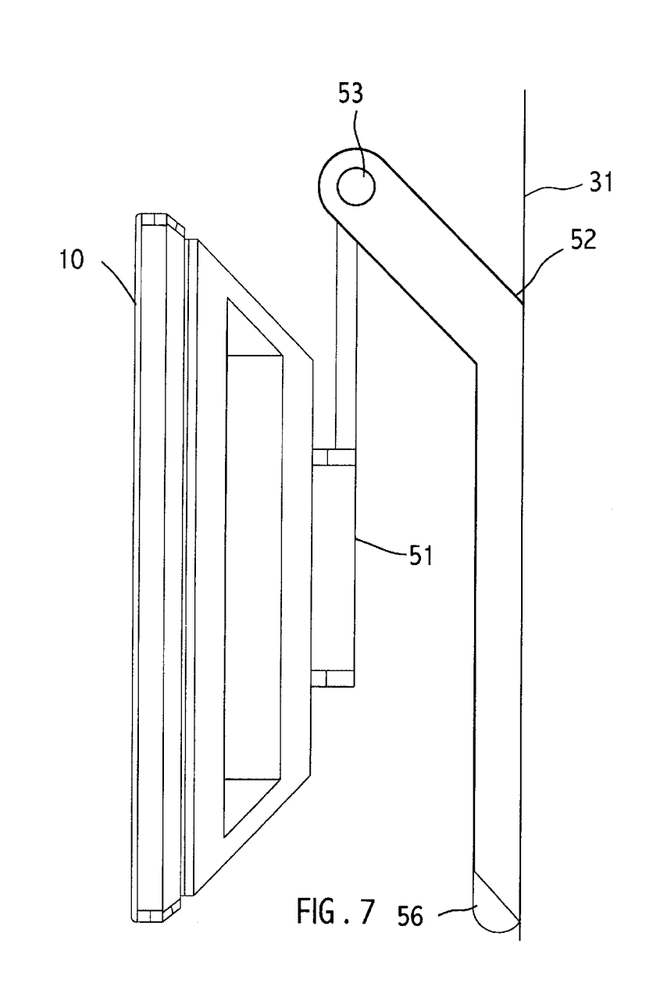
FIG. 7 illustrates a side elevational view showing an alternative operation of the second preferred embodiment of the invention.

FIG. 7 illustrates an alternative application of mounting a flat panel display apparatus. In which, users pivot the supporting member 52 to an appropriate angle and followed that mount the supporting member 52 to the wall 31 with holes 14 on the supporting member 52 to support the display screen 10.

Figure 8:
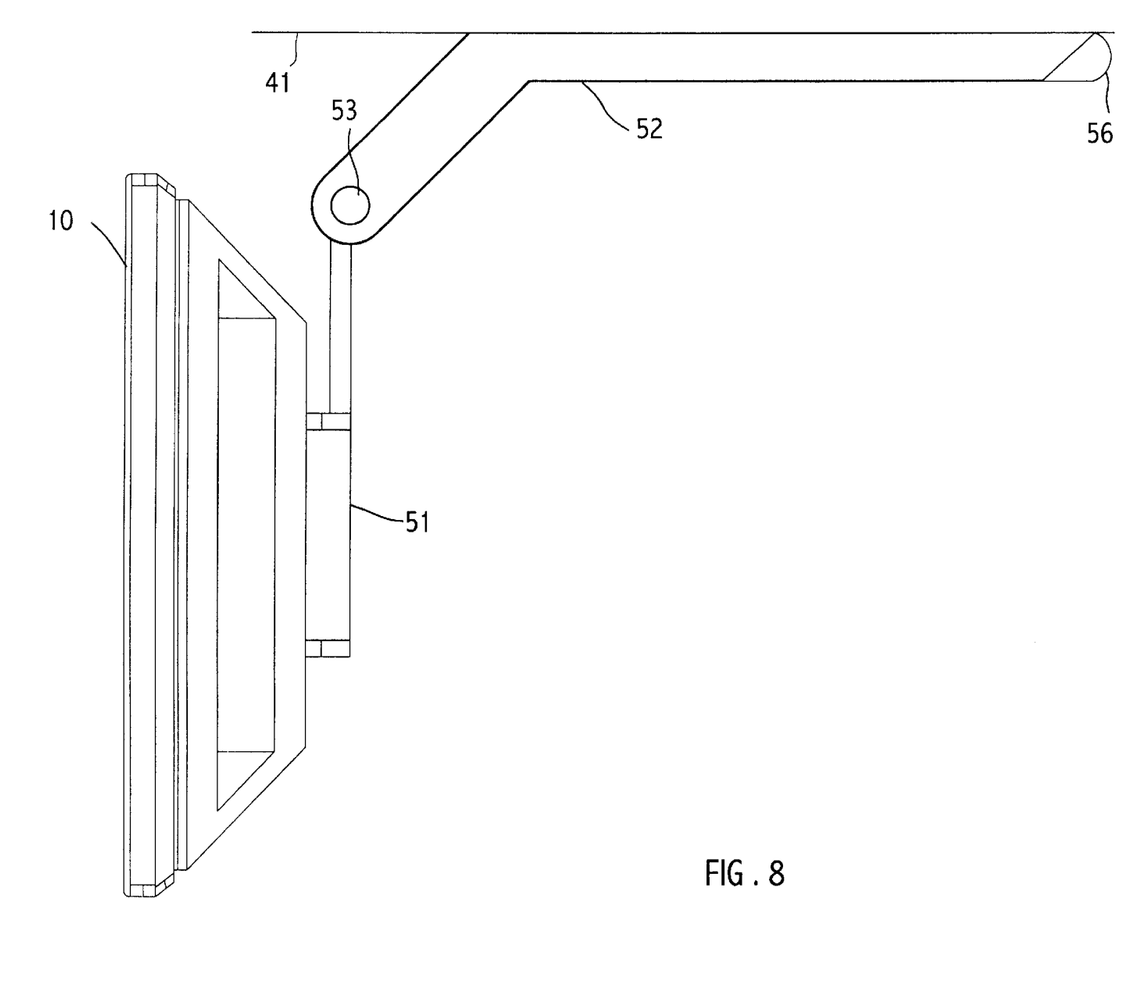
FIG. 8 illustrates a side elevational view showing another alternative operation of the second preferred embodiment of the invention.

FIG. 8 illustrates the other application of mounting a flat panel display apparatus, where users pivot the supporting member 52 to an appropriate angle and followed that mount the supporting member 52 to the ceiling 41 to support the display screen 10.

While the invention has been described with reference to various illustrative embodiments, the description herein should not be construed in a limiting sense. Various modifications of the illustrative embodiments, as well as other embodiments of the invention, will be apparent to those skilled in the art upon reference to this description. It is therefore contemplated that the appended claims will, cover any such modifications or embodiments as may fall within the scope of the invention defined by the following claims and their equivalents.

What is claimed is:

1. A mounting apparatus used for a flat panel display comprising:

a handle member disposed at an edge of the flat panel display;

a supporting member pivotally secured to the handle member, the supporting member comprising a first arm portion and a second arm portion where an obtuse angle is formed between the first arm portion and the second arm portion; and a stand member disposed at an end of the second arm portion;

wherein the second arm portion comprises holes for fastening the mounting apparatus to either a wall or a ceiling.

2. The mounting apparatus of claim 1, wherein the supporting member further comprises a tube member pivotally secured to an end of the first arm portion to allow the supporting member to pivot on the handle member.

3. The mounting apparatus of claim 1, wherein a predetermined height of the supporting member ranges from the 0.8-fold to one-fold of the total length of an upright flat panel display and the handle member attached therewith.

4. The mounting apparatus of claim 1, wherein the stand member is made of rubber.

5. A flat panel display apparatus:

a display screen;

a handle member disposed at an edge of the display screen;

a supporting member pivotally secured to the handle member, the supporting member comprising a first arm portion and a second arm portion where an obtuse angle is formed between the first arm portion and the second arm portion; and a stand member disposed at an end of the second arm portion;

wherein the second arm portion comprises holes for fastening the mounting apparatus to either a wall or a ceiling.

6. The flat panel display apparatus of claim 5, wherein the supporting member further comprises a tube member pivotally secured to an end of the first arm portion to allow the supporting member to pivot on the handle member.

7. The flat panel display apparatus of claim 5, wherein a predetermined height of the supporting member ranges from the 0.8-fold to one-fold of the total length of an upright display screen and the handle member attached therewith.

8. The flat panel display apparatus of claim 5, wherein the stand member is made of rubber.

9. A mounting apparatus used for a flat panel display comprising:

a connecting member disposed at the back of the flat panel display;

a supporting member pivotally secured to the connecting member, the supporting member comprising a first arm portion and a second arm portion where an obtuse angle is formed between the first arm portion and the second arm portion; and a stand member disposed at an end of the second arm portion;

wherein the second arm portion comprises holes for fastening the mounting apparatus to either a wall or a ceiling.

10. The mounting apparatus of claim 9, wherein the supporting member further comprises a tube member pivotally secured to an end of the first arm portion to allow the supporting member to pivot on the connecting member.

11. The mounting apparatus of claim 9, wherein a predetermined height of the supporting member ranges from the 0.8-fold to one-fold of the total length of an upright flat panel display and the connecting member attached therewith.

12. The mounting apparatus of claim 9, wherein the stand member is made of rubber.

13. A flat panel display apparatus comprising:

a display screen;

a connecting member disposed at the back of the display screen;

a supporting member pivotally secured to the connecting member, the supporting member comprising a first arm portion and a second arm portion where an obtuse angle is formed between the first arm portion and the second arm portion; and a stand member disposed at an end of the second arm portion;

wherein the second arm portion comprises holes for fastening the mounting apparatus to either a wall or a ceiling.

14. The flat panel display apparatus of claim 13, wherein the supporting member further comprises a tube member pivotally secured to an end of the first arm portion to allow the supporting member to pivot on the connecting member.

15. The flat panel display apparatus of claim 13, wherein a predetermined height of the supporting member ranges from the 0.8-fold to one-fold of the total length of an upright flat panel display and the connecting member attached therewith.

16. The flat panel display apparatus of claim 13, wherein the stand member is made of rubber.

* * * * *